United States Patent [19]

Circello et al.

[11] Patent Number: 4,506,340
[45] Date of Patent: Mar. 19, 1985

[54] METHOD AND APPARATUS FOR PRODUCING THE RESIDUE OF THE PRODUCT OF TWO RESIDUES

[75] Inventors: Joseph C. Circello, Phoenix; Thomas H. Howell, Scottsdale; Gregory C. Edgington, Glendale, all of Ariz.

[73] Assignee: Honeywell Information Systems Inc., Phoenix, Ariz.

[21] Appl. No.: 481,684

[22] Filed: Apr. 4, 1983

[51] Int. Cl.³ ............................................. G06F 7/72
[52] U.S. Cl. ................................................... 364/746
[58] Field of Search ................... 364/746, 739; 371/54

[56] References Cited

U.S. PATENT DOCUMENTS

| | | | |
|---|---|---|---|
| 4,346,451 | 8/1982 | Katayama | 364/746 |
| 4,363,106 | 12/1982 | Tai | 364/746 |
| 4,366,549 | 12/1982 | Katayama | 364/746 |

OTHER PUBLICATIONS

Soderstrand et al., "A High-Speed Low-Cost Modulo Pi Multiplier with RNS Arithmetic Applications", *Proceedings of the IEEE*, vol. 68, No. 4, Apr. 1980, pp. 529-532.
Taylor, "Large Moduli Multipliers for Signal Processing", *IEEE Trans. on Circuits and Systems*, vol. CAS-28, No. 7, Jul. 1981, pp. 731-736.

*Primary Examiner*—David H. Malzahn
*Attorney, Agent, or Firm*—E. W. Hughes; L. J. Marhoefer

[57] ABSTRACT

Method and apparatus for producing the residue of the product of a multiplier and a multiplicand where the multiplier, multiplicand and product are residues with respect to a check base m, and where $m=(2^b-1)$ and b is the number of bits in a residue. An addressable memory device has at least $2\ 2(b-1)$ memory locations with each memory location having an address of $2\ (b-1)$ bits. The address of each memory location can be considered as having two components each of $(b-1)$ bits. The residue stored at each addressable location of the device is the residue of the product of the two components of its address. In response to each address being applied to the memory device, the residue of the product of the two components stored at the addressed memory location is read out of the device. The lower order $(b-1)$ bits of the multiplier is applied to the device if the most significant bit of the multiplier is a logical zero. If the most significant bit of the multiplier is a logical one, the complement of the lower order $(b-1)$ bits is applied and forms one component of the address of a memory location of the device. Similarly, the value of the most significant bit of the multiplicand determines whether the lower order $(b-1)$ bits of the multiplicand or their complements form the other component of the address applied to the memory device. The residue read out of the addressed location is complemented to produce the residue of the product stored at the addressed memory location if and only if one of the most significant bits of the multiplier and multiplicand is a logical one, otherwise the residue read out of the memory device is the residue of the product of the multiplier and the multiplicand.

11 Claims, 4 Drawing Figures

FIG. 4

METHOD AND APPARATUS FOR PRODUCING THE RESIDUE OF THE PRODUCT OF TWO RESIDUES

BACKGROUND OF THE INVENTION

1. Field of the Invention

This invention is in the field of methods and apparatus for producing the product of a multiplier and a multiplicand where the multiplier, multiplicand and product are each a residue with respect to a check base m, where $m=(2^b-1)$, and b is the number of bits of a residue. Such methods and apparatus are used in the binary and arithmetic units of digital data processing systems to check the accuracy of multiplying two operands.

2. Description of the Prior Art

To assure the accuracy of arithmetic operations on binary numbers in digital data processors, there is a need to validate such operations. Various ways of doing this have been developed, such as by parallel execution of the same operation on the same operands, or by the use of parity checks at each stage of an operation. Another way to validate the accuracy of arithmetic operations such as multiplication of binary numbers is to validate each such operation using residue theory mathematics in which the residue (r) of a number, or operand, "X" is the remainder resulting from the division of "X" by the check base "m", or $$X = km + r.$$

In the foregoing, k is an integer constant such that r is equal to or greater than 0 and less than m. A common representation of this definition is $$r = |X|_m.$$

Any arithmetic operation $\phi$ performed on two operands A and B produces a resultant R which can be represented as $R = \phi(A,B)$. The basic residue theory check equation is that $$|R|_m = \phi||A|_m, |B|_m|_m.$$

Thus, the residue of the resultant R is equal to the operation $\phi$, multiplication, for example, performed on the residues of the operands, in this case multiplier and multiplicand A and B. The multiplication operation $\phi$ performed on the residues of multiplier A and multiplicand B is defined as being executed in modulo m arithmetic. The significance of the foregoing is that, if the two operands are multiplied, then the residue of the result of that multiplication, the residue of the product, will equal the residue of the result, or product, of the multiplication performed on the residues of the two operands, it being a requirement that all residues are determined with respect to the same check base m. Residue checking has the advantage that it will detect all single bit errors in the resultant R.

From the foregoing, it is apparent that there is a need for a multiplier modulo with respect to a given check base "m". Typically, this type of multiplication is accomplished by means of a table look-up method using a read only memory (ROM) device in which the address is composed of the residues of the multiplier and the multiplicand each of b bits, and in the addressed location there is stored the residue of the product of the multiplier and the multiplicand all to the same check base m, where $m=(2^b-1)$. In the foregoing equation, b is an integer, and is the number of bits in each residue.

Since there is always pressure to reduce costs and increase the speed of all operations performed by digital data processing systems, there is a need to implement methods and apparatus which minimize the size of the random access memory required to store the residues of the products of two residues to reduce the cost of implementation, other factors remaining the same, as well as to produce the residue of the product of any given multiplier and multiplicand which are also residues with respect to the check base m, as quickly and as reliably as possible.

BRIEF SUMMARY OF THE INVENTION

The present invention provides both method and apparatus for producing the product of a multiplier and a multiplicand in which the size of the memory device required is reduced to substantially one-fourth that required by prior art methods and apparatus. Applicants have discovered that the multiplication tables for the residues of the products of two numbers, each of b bits with respect to the base m, where $m=(2^b-1)$, are symmetric with respect to the axes of symmetry of the tables. As a result, only one-fourth of the table need be used, or implemented, by being stored in a random access memory device such as a ROM. This is accomplished by writing into each addressable memory location of a random access memory device the residue of b bits of the product of the lower order (b−1) bits of the multiplier and of the multiplicand where the address of each memory location is made up of two components, each being the lower order (b−1) bits of the multiplier and multiplicand respectively or their complements. The lower order (b−1) bits of the multiplier or their complements form one component of the address of a memory location in the ROM. The lower order (b−1) bits of the multiplier are applied to the ROM as a component of the address of an addressable memory location in the ROM, only if the most significant bit of the multiplier is a logical zero. The complements of the lower order (b−1) bits of the multiplier are applied to the ROM as a component of an address only if the most significant bit of the multiplier is a logical one. The lower order (b−1) bits of the multiplicand or their complements form the second component of the address of a memory location in the ROM. If the most significant bit of the multiplicand is a logical zero the lower order (b−1) bits are, or form, the second component of the address of a given memory location of the ROM. If the most significant bit of the multiplicand is a logical one, the lower order bits of the multiplicand are complemented to form a second component of the address. During a read cycle, the ROM in response to conventional control signals and the address signals applied the ROM will read out of its addressed memory location the residue of the product stored therein. The residue read out of the memory device during each read cycle is complemented if and only if one of the most significant bits of the multiplier and multiplicand is a logical one, otherwise the residue of the product is as stored in the addressed location.

It is, therefore, an object of this invention to provide an improved method and apparatus for producing the residue of the product of two numbers, all of which residues are with respect to the same base.

It is another object of this invention to provide an improved table look-up method and apparatus for producing the residue of the product of two residues, all with respect to a given base which requires a substantially smaller memory device in which the table is stored.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 4 is a Modulo 31 Residue Multiplication Table.

DETAILED DESCRIPTION

Figure 1:
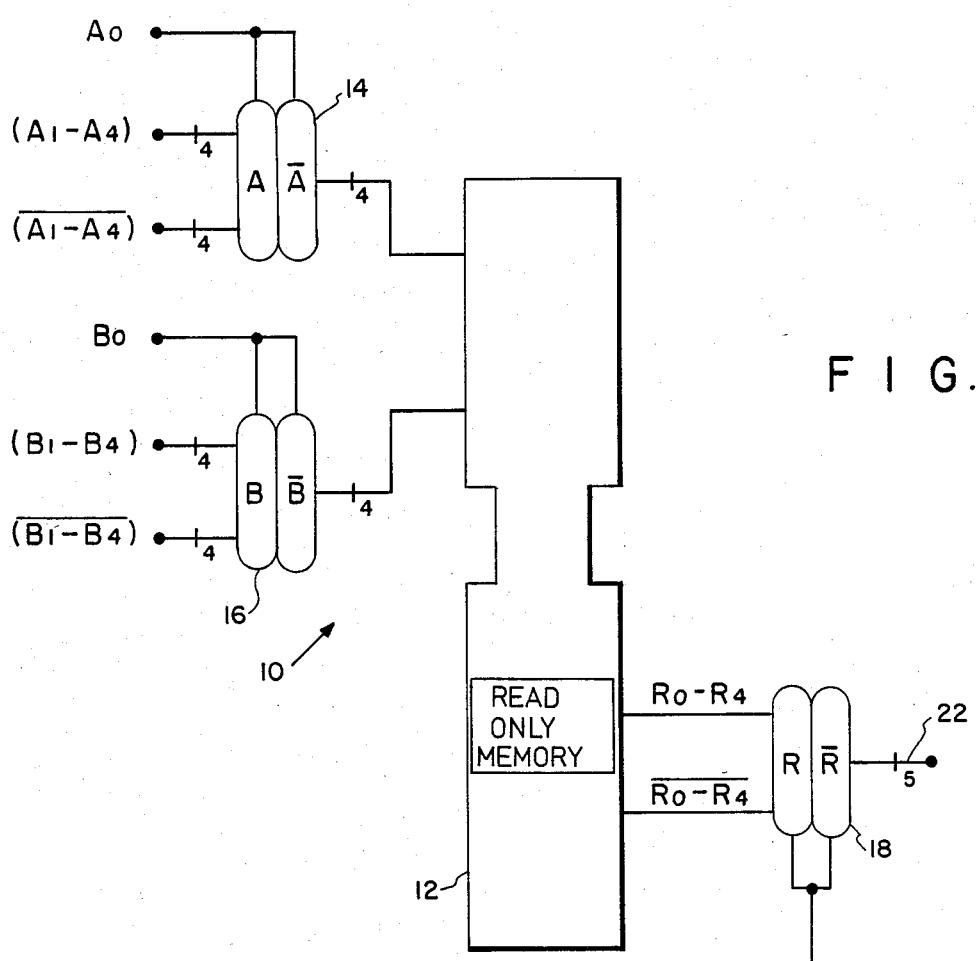
FIG. 1 is a schematic block diagram of the apparatus of the invention for producing the product of a multiplier and a multiplicand, where the multiplier, multiplicand and product are residues with respect to a check base of $$m = (2^b - 1);$$

In FIG. 1, the multiplier is denoted as A, the multiplicand is denoted as B, and the product is denoted as R. A, B and R are residues with respect to a check base m, where $m = (2^b - 1)$ and b is a positive integer greater than zero. In the preferred embodiment, b = 5, so that m = 31. It follows that in the preferred embodiment, A, B and R are binary numbers each of five bits. In binary form, A can be written as:

$$A = A_0, A_1, A_2, A_3, A_4 = (A_0 - A_4)$$

where $A_0$ is the most significant bit of A and $A_4$ is the least significant bit. Similarly, B can be written as:

$$B = B_0, B_1, B_2, B_3, B_4 = (B_0 - B_4);$$

and R can be written as:

$$R = R_0, R_1, R_2, R_3, R_4 = (R_0 - R_4).$$

Table look-up apparatus 10 includes a conventional read only memory (ROM) device 12, which, in the preferred embodiment, has the capability of storing 5 bits at each of $2^{2(b-1)}$ addressable memory locations. In the preferred embodiment, since b = 5, the number of addressable memory locations required is $2^8 = 256$. It follows that the address of a memory location of ROM device 12 is an 8-bit binary number. The address of each memory location of ROM device 12 is considered as being divided into two components each of 4 bits. The lower order bits of multiplier A; namely, bits $(A_1-A_4)$ or their complement $(\overline{A_1-A_4})$ constitute one component of an address, and the lower order bits of multiplicand B; namely, bits $(B_1-B_4)$, or their complements $(\overline{B_1-B_4})$ constitute the other or second component. The two components as concatenated to form the address of a memory location of ROM 12. In FIG. 1, the lower order bits $(A_1-A_4)$ and their complements $(\overline{A_1-A_4})$ are applied to one of two select switch 14. The most significant bit $A_0$ of multiplier A is also applied to switch 14 and, depending upon the value of $A_0$, determines whether the lower order bits $(A_1-A_4)$ or their complements $(\overline{A_1-A_4})$ are, or form, one component of the address of a memory location in device 12.

The lower order bits $(B_1-B_4)$ and their complements $(\overline{B_1-B_4})$ are applied to one of two select switch 16. The most significant bit $B_0$ of multiplicand B is also applied to switch 14 and, depending on its value, determines whether the lower order bits $(B_1-B_4)$ or their complements $(\overline{B_1-B_4})$ are the second, or other component of the address of a memory location in device 12.

The product R stored at each of the $2^{2(b-1)}$ addressable memory locations of the conventional random access memory device 12 is the residue with respect to the base m of the product of the two components of the address of that memory location. The product R, bits $(R_0-R_4)$, read out of each addressed memory location during a memory read cycle in response to the address bits applied to the device, and the complements of R; namely, $(\overline{R_0-R_4})$ are applied to one of two select switch 18. The most significant bit $A_0$ of multiplier A and the most significant bit $B_0$ of multiplicand B are applied to exclusive OR gate 20-1. The output of gate 20-1 is applied to switch 18 to determine whether R or $\overline{R}$ is the output of apparatus 10 on resultant, or product, output bus 22.

Figure 2:
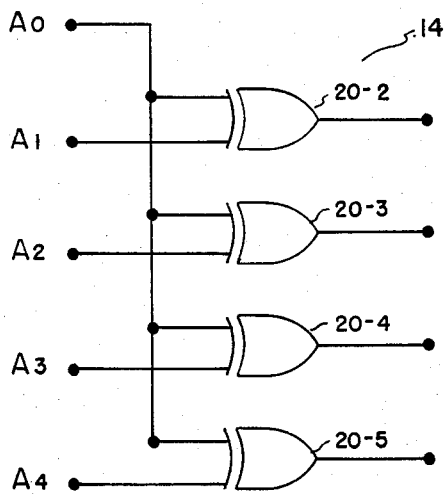
FIG. 2 is a circuit diagram of switch means for producing one component of a memory address.

In FIG. 2, the details of a preferred implementation of a functional equivalent of switch 14 are illustrated. Switch 14, as illustrated, consists of four exclusive OR gates 20-2, 20-3, 20-4, and 20-5. The most significant bit $A_0$ of multiplier A is applied to one of the two input terminals of each of the exclusive OR gates 20-2 through 20-5. The other input terminal of gate 20-2 has applied to it bit $A_1$ of multiplier A, bit $A_2$ is applied to the second input terminal of gate 20-3, bit $A_3$ to the second input terminal of gate 20-4 and bit A-4 to the second terminal of gate 20-5. The function of gate 14 is such that if the most significant bit $A_0$ of the multiplier A is a logical zero, then the output of gates 20-2 through 20-5 will be $A_1$, $A_2$, $A_3$, $A_4$, respectively. If $A_0$ is a logical one, the outputs of gate 20-2 through 20-5 are the complements thereof, i.e., $\overline{A_1}$, $\overline{A_2}$, $\overline{A_3}$, $\overline{A_4}$, or $(\overline{A_1-A_4})$. The preferred implementation of a functional equivalent of switch 16 is substantially like that of switch 14 as illustrated in FIG. 2 except that the inputs of its four exclusive OR gates are corresponding bits of the multiplicand B.

Figure 3:
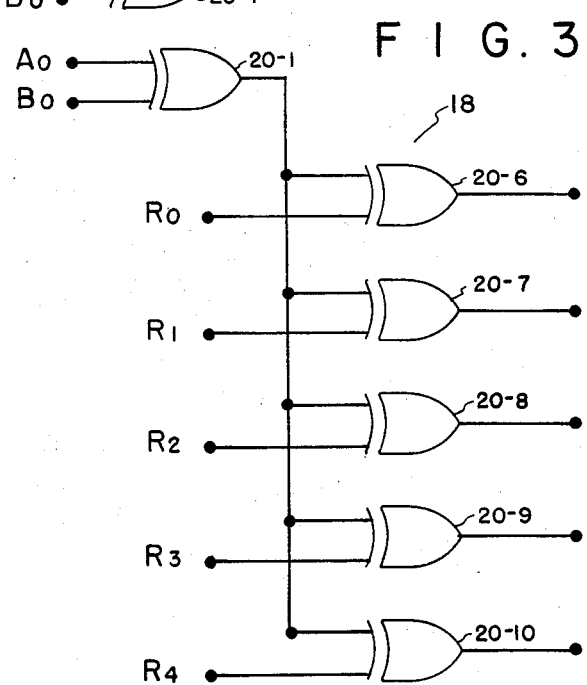
FIG. 3 is a circuit diagram of a switch for producing the product of the multiplier and multiplicand stored at a given memory location in a memory device.

In FIG. 3, details of the preferred implementation of a functional equivalent of switch 18 are illustrated. Switch 18 includes five exclusive OR gates 20-6 through 20-10. The output of gate 20-1 is applied to one terminal of each of the gates 20-6 through 20-10. The other terminal of each has a different bit of the resultant, or product, R applied to it, $R_0$ to gate 20-6, $R_1$ to gate 20-7, etc.

If the output of gate 20-1 is a logical zero, the outputs of gates 20-6 through 20-10 correspond to bits $(R_0-R_4)$, respectively. If the output of gate 20-1 is a logical one, the output of gates 20-6 through 20-10 will correspond to the complements of bits $(R_0-R_4)$ or $(\overline{R_0-R_4})$.

Figure 4:
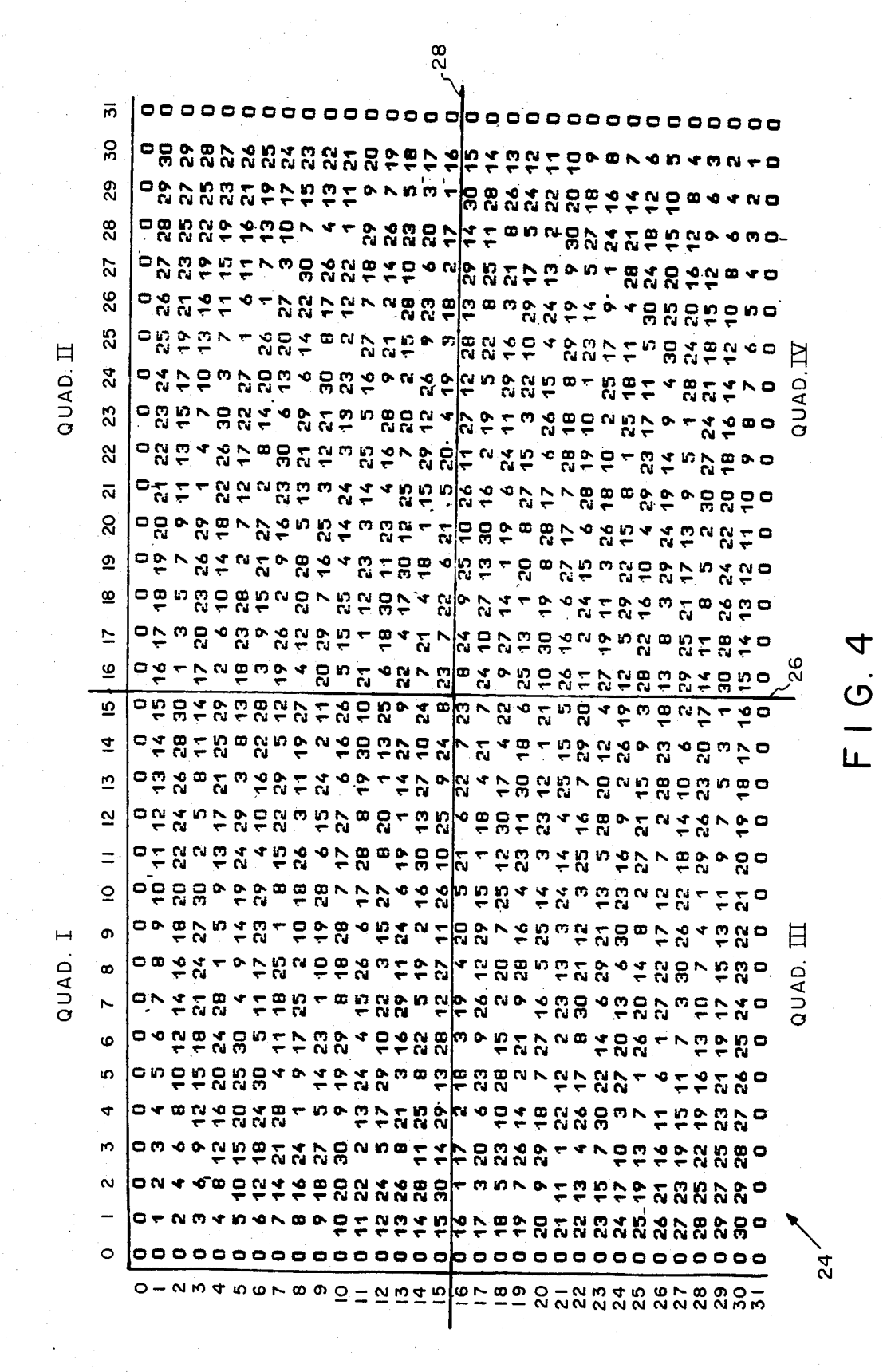

In FIG. 4, a complete multiplication table 24 for the residues of the products of two numbers with respect to the base 31, $m = (2^5 - 1)$ is illustrated. In table 24, units of the multiplier can be considered as corresponding to the abscissa and those of the multiplicand corresponding to the ordinate. For convenience, table 24 uses decimal numbers for the multipliers, multiplicands and products, rather than binary numbers, as would be the case in implementing the invention in a digital data processing system. Table 24 is divided into four quadrants, I, II, III, and IV, by vertical symmetric axis 26 which is located between the numbers 15 and 16 of the abscissa and horizontal symmetrical axis 28 located between numbers 15 and 16 of the ordinate.

From a perusal of table 24, it can be learned that the sum of the residues equally spaced on either side of vertical axis of symmetry 26 in any given row add up to 31, which is 0 Mod 31. Such symmetry also exists across the horizontal axis 28 between quadrants I and III and between quadrants II and IV. In addition, there is symmetry between Quadrants I and IV of table 24 and between Quadrants II and III. This symmetry permits one to implement a table look-up to produce the residue of the product of two residues to the base $m=(2^b-1)$ by recording or writing only one Quadrant of table 24, for example Quadrant 1, into memory device 12. Only the lower order bits of the multiplier and multiplicand are used to form the two components of the address of the product residue of the two components stored in memory location, the address of which is that of the two components in the memory device. The lower order bits of the multiplier and multiplicand are complemented only if the most significant bit of the multiplier or multiplicand is a logical one. The product stored at the addressed location is complemented if and only if one of the most significant bits of the multiplier and multiplicand is a logical one.

In practicing this invention, any of the four quadrants of table 24 can be used, or can be written into the ROM. In the preferred embodiment, the first quadrant was used. If other quadrants are used, routine modifications of the circuits for complementing or not complementing the address bits applied to the ROM and the product stored in each addressed location will produce the residue of the product of the two residues to the check base m.

From the foregoing, it is readily apparent that the method and apparatus of this invention permits one to produce the residue of the product of two numbers with respect to the base $m=(2^b-1)$ using a table look-up technique in which only one quadrant of the table is used. This reduces the size of the memory device needed to produce the necessary products to one-fourth of that of the prior art devices and methods.

What is claimed is:

1. Apparatus for producing the residue of the product of a multiplier and a multiplicand said multiplier and multiplicand also being residues, also being residues, all said residues being with respect to a check base m, where $m=2^{(b-1)}$, said residues being binary numbers of b bits each; comprising:

a memory device having a plurality of addressable memory locations, the address of each memory location having $2(b-1)$ bits, each of said addresses being divided into a first and a second component, each of $(b-1)$ bits; the first component being the lower order $(b-1)$ bits, or their complements, of the multiplier and the second component being the lower order $(b-1)$ bits, or their complements, of the multiplicand, bits of the residue of the product of the two components of the address being stored in a memory location having an address, the address of each location being that of the two components; said memory device in response to an address being applied to it during a read cycle producing signals representing the bits stored at the addressed location, where an address has $2(b-1)$ bits;

first circuit means for applying to the memory device a first component of the address; namely, the signals representing the lower order $(b-1)$ bits of the multiplier if the signal representing the most significant bit of the multiplier is a logical zero and for applying the complements of the signals representing the lower order $(b-1)$ bits of the multiplier if the signal representing the most significant bit of the multiplier is a logical one;

second circuit means for applying to the memory device the second component of the address; namely, the signals representing the lower order $(b-1)$ bits of the multiplicand if the signal representing the most significant bit of the multiplicand is a logical zero, and for applying signals representing the complements of the lower order $(b-1)$ bits of the multiplicand if the signal representing the most significant bit of the multiplicand is a logical one; and third circuit means to which are applied the signals produced by the memory device during a read cycle, said signals representing the b bits stored at the addressed location in the memory device, said third circuit means producing signals representing complements of the b bits stored at the addressed location of the memory device if and only if one of the most significant bits of the multiplicand and the multiplier is a logical one, otherwise said third circuit means producing signals representing the b bits stored at the addressed location.

2. Apparatus as defined in claim 1 in which the memory device is a random access memory.

3. Apparatus as defined in claim 2 in which the memory device is a ROM.

4. Apparatus as defined in claim 2 in which $m=31$ and $b=5$.

5. Apparatus as defined in claim 4 in which the number of addressable memory locations is at least $2^{2(b-1)}$.

6. The method for producing a residue of the product of residues of a multiplier and a multiplicand, each of said residues being with respect to a check base m, where $m=(2^b-1)$, each of said residues being binary numbers of b bits, comprising the steps of:

writing into a memory device having a plurality of addressable memory locations the residue of the product of a multiplier component and a multiplicand component, each component having $(b-1)$ bits and being the residue of the multiplier and multiplicand; the address of each addressable memory location of said device being the concatenation of said two components;

forming the multiplier component of an address from the multiplier, said multiplier component being the lower order $(b-1)$ bits of the multiplier when the most significant bit of the multiplier is a logical zero and the complements of the lower order $(b-1)$ bits of the multiplier when the most significant bit of the multiplier residue is a logical one;

forming the multiplicand component of an address from the multiplicand, said multiplicand component being the lower order $(b-1)$ bits of the multiplicand when the most significant bit of the multiplicand is a logical zero, and the complement of the lower order (b−1) bits of the multiplicand when the most significant bit of the first member is a logical one;

concatenating the first and second components to form an address of a memory location of said memory device and applying the address so formed to the memory device, said memory device in response to the receipt of the the address of a memory location of the memory device producing the residue of the product of the first and second components stored at the addressed location; and complementing the residue of the products stored at the addressed location and produced by the memory if and only if one of the most significant bits of the multiplier and multiplicand is a logical one.

7. The method of claim 6 in which the memory device is a random access memory device.

8. The method of claim 7 in which the memory device is a read only memory device.

9. The method of claim 7 in which m=31 and b=5.

10. The method of claim 8 in which the number of addressable memory locations is at least $2^{2(b-1)}$.

11. Apparatus for producing the residue of the product of the residues of a multiplier and a multiplicand, all said residues being with respect to a check base m, where $m=(2^b-1)$, said residues being binary numbers of b bits each; comprising:

a memory device having a plurality of addressable memory locations, the address of each memory location having 2(b−1) bits, each of said addresses being divided into a first and a second component, each of (b−1) bits; the first component being the lower order (b−1) bits of the multiplier or their complements and the second component being the lower order (b−1) bits of the multiplicand or their complements, bits of the residue of the product of the two components of the address being stored in a memory location having an address, the address of each location being that of the two components; said memory device in response to each set of address signals representing the bits of the address of that component being applied to it during a read cycle producing signals representing the bits stored at the addressed location;

first circuit means for applying to the memory device signals representing the lower order bits of the residue of the residue of the multiplier if the signal representing the most significant bit of the residue of the multiplier has one value and for applying the complements of the signals representing the lower order bits of the residue of the multiplier if the signal representing the most significant bit of the residue of the multiplier has a second value, said signals being a component of an address;

second circuit means for applying to the memory device signals representing the lower order bits of the residue of the multiplicand if the signal representing the most significant bit of the residue of the multiplicand has one value, and for applying signals representing the complements of the lower order bits of the residue of the multiplicand if the signal representing the most significant bit of the residue of the multiplicand has a second value, said signals being another component of an address; and third circuit means to which are applied the signals produced by the memory device during a read cycle, said signals representing the bits stored at the addressed location in the memory device, said third circuit means producing signals representing complements of the bits stored at the addressed location of the memory device if and only if one of the most significant bits of the multiplicand and the multiplier has a second value, otherwise said third circuit means producing signals representing the bits stored at the addressed location.

* * * * *